United States Patent [19]

Ikemori et al.

[11] Patent Number: 4,707,103
[45] Date of Patent: Nov. 17, 1987

[54] OPTICAL SYSTEM OF VARIABLE MAGNIFICATION

[75] Inventors: Keiji Ikemori, Kanagawa; Takeshi Koyama, Tokyo, both of Japan

[73] Assignee: Canon Kabushiki Kaisha, Japan

[21] Appl. No.: 828,959

[22] Filed: Feb. 12, 1986

[30] Foreign Application Priority Data

Feb. 12, 1985 [JP] Japan .................................. 60-024911
Apr. 9, 1985 [JP] Japan .................................. 60-075110

[51] Int. Cl.⁴ .......................... G03B 3/00; G03B 13/08
[52] U.S. Cl. ...................................... 354/403; 354/201; 354/225
[58] Field of Search ...................... 354/402, 403, 195.1, 354/199, 200, 201, 219, 224, 225; 350/423, 424, 427, 429; 358/225

[56] References Cited

U.S. PATENT DOCUMENTS 3,914,034 10/1975 Komine ............................ 354/199 X
4,171,890 10/1979 Mizuki et al. ................... 354/225 X
4,357,085 11/1982 Niwa et al. ........................... 354/403
4,544,250 10/1985 Tanaka et al. .................. 354/224 X Primary Examiner—W. B. Perkey
Attorney, Agent, or Firm—Toren, McGeady & Associates

[57] ABSTRACT

An optical system of variable magnification including an image forming lens system having at least one optical member axially movable for varying the image magnification, and a light beam splitting device in the optical path of the lens system, the optical member and the splitting device being arranged to move simultaneously.

23 Claims, 12 Drawing Figures

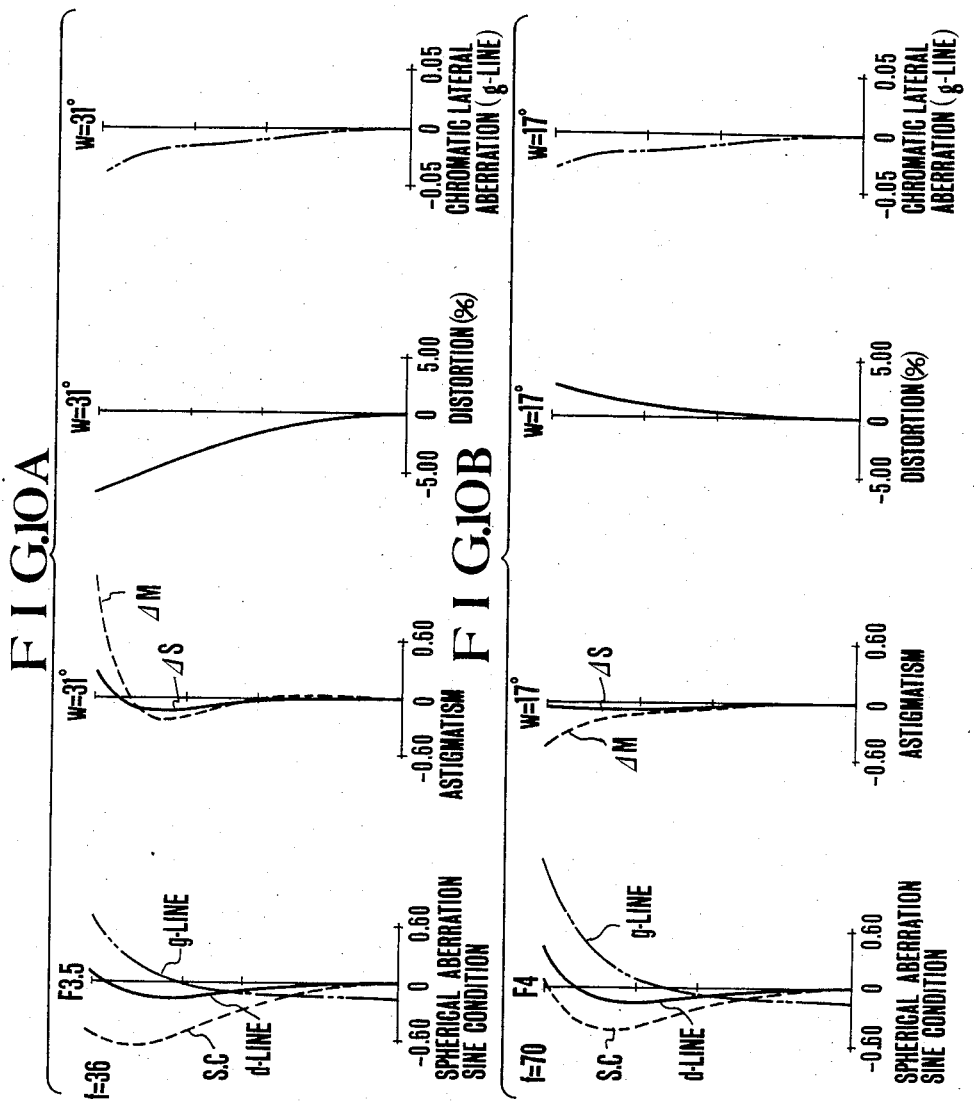

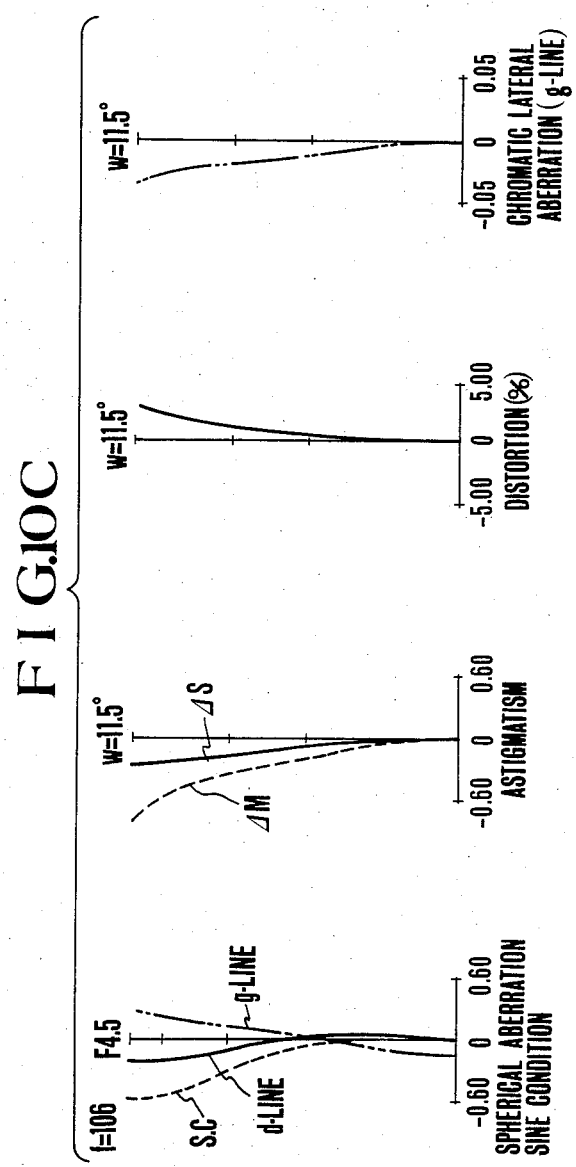

OPTICAL SYSTEM OF VARIABLE MAGNIFICATION

BACKGROUND OF THE INVENTION

1. Field of the Invention

This invention relates to variable magnification optical systems having beam splitters, and more particularly to an arrangement of a view finder or an optical apparatus, such as light emitter or receptor, for automatic focusing adjustment on the path of a split-off part of a light beam.

2. Description of the Prior Art

In the field of 8mm cine cameras, or video cameras, as the size of the effective area of the picture frame is relatively small, it is customary for a beam splitter to take its place in one of the air separations between the members of the photographic lens system so that a light beam toward the film is split into two parts, of which the split-off part goes to a view finder system.

Taking the example of a zoom lens as the photographic lens system, comprising, from front to rear, a first or focusing lens unit stationary during zooming, a second lens unit as the variator, a third lens unit as the compensator, a fourth lens unit from which an afocal beam emerges, and a fixed fifth lens unit, the aperture stop for limiting the light beam and the beam splitter are, in many cases, put in the space between the fourth and fifth lens units.

As far as such a zoom lens for a relatively small effective picture frame is concerned, despite the aperture stop being held stationary during zooming, it is even possible for the beam splitter to be placed near the aperture stop while permitting the beam splitter and the finder system to be of relatively small size.

In the field of 35 mm cameras of the TTL (Through-The-Lens), however, it is customary, particularly in the standard objective, that the aperture stop is made to axially move with zooming. Otherwise, minimization of the bulk and size of the objective could not be achieved. This is exemplified in Japanese Laid-Open Patent Application No. SHO 57-20713.

In application of the aforesaid splitter arrangement to conventional zoom lenses for the 35mm format, therefore, it results that as zooming goes in either direction, the aperture stop moves away from the beam splitter. For this reason, the beam splitter, in the form of a glass block having a half-reflection mirror inclined therein, is necessarily of very large axial thickness to admit even the oblique beam from the margin of the prescribed angular field, and further, the effective diameter of the finder system must also be increased. Thus, the use of the prior known arrangement of the beam splitter and finder system has tended to increase the bulk and size the entire system of the zoom lens.

As to the automatic focusing adjustment of the optical system, in many cameras including both photographic and video cameras, light from an emitter in the camera housing is projected, either directly or through a portion of the objective optical system, onto an object to be photographed, and the reflection of the light from the object is sensed by a receptor in the camera housing either directly or through a portion of the optical system. A typical example of the range finder arrangement of such a so-called modified TTL type, in which light passing through a portion of the optical system is used for detecting the in-focus condition and the light source is positioned within the camera body, is shown in, for example, Japanese Laid-Open Patent Application No. SHO 56-165126.

The range finders of the active type described above generally make use of a light source for emitting infrared radiation in combination with a dichroic mirror of high transmittance for the visible spectral range and high reflectance for the infrared range as the beam splitter in one of the air separations between the members of the optical system.

This beam splitter, when the optical system is of the zoom type, is arranged, in most cases, behind the zoom section to remain stationary during zooming. For this reason, as the aperture stop is moved along with the zoom section to improve the aberration correction and to prevent the diameter of the objective from increasing, the resultant variation of the distance from the beam splitter to the aperture stop with zooming gives rise to the following problem. Referring to FIG. 1, the aperture stop B that moves in unison with the zoom section A is shown as having moved farther away from the beam splitter C by zooming, causing the oblique pencil to be eclipsed by the dichroic mirror D of the beam splitter C. To avoid this, the axial thickness of the beam splitter C must be largely increased. As a result, the physical length of the objective will be increased objectionably. Also, because the transmission of light across the dichroic mirror D differs with diffferent image heights, color are unevenly changed in the marginal zone of the picture frame.

SUMMARY OF THE INVENTION

A first object of the present invention is to achieve a minimization of the size of a beam splitter arranged in a variable magnification optical path, and further to achieve a minimization of the size of an image forming optical system employing that beam splitter.

A second object is to provide a zoom lens having a beam splitter arranged in one of the air separations between the members of a photographic system thereof, so that a light beam directed toward a photographic film is split off to a view finder system, whereby the beam splitter is made movable for the purpose of minimizing the size of the beam splitter and the finder system, which leads to achieving a minimization of the size of the entire system of the zoom lens.

A third object is to provide an optical system having an aperture stop movable along with an image magnification varying section, in which a beam splitter, constituting part of a range finder, is used, as arranged in one of the air separations of the members of the optical system, without involving an unduly large increase in the size of the entire lens system and without causing production of color unevenness in the marginal zone of the image format for high grade imaging performance despite the association of such focus detecting means.

BRIEF DESCRIPTION OF THE DRAWINGS

FIGS. 10A, 10B and 10C are graphic representations of the various aberrations of the lens of FIGS. 8 and 9 in the wide angle, intermediate and telephoto positions, respectively.

DETAILED DESCRIPTION OF THE PREFERRED EMBODIMENTS

Figure 1:
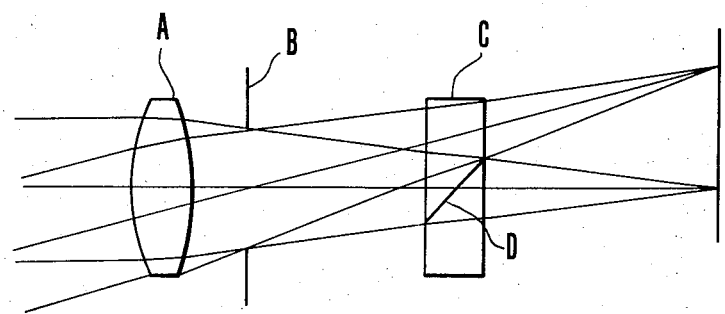
FIG. 1 is a diagram of geometry considered to explain the problem.
Figure 2:
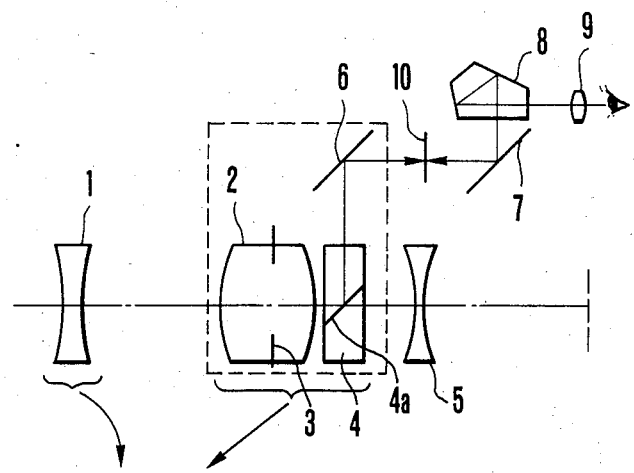
FIGS. 2 and 3 are schematic longitudinal section views of two embodiments of optical systems according to the invention, respectively.

In FIG. 2 there is shown an embodiment of the optical system according to the present invention, comprising, from front to rear, first and second lens units 1 and 2 axially movable for zooming and constituting a zoom section, having an aperture stop 3 in the second lens unit 2 a light beam splitting member 4 having a half-reflection mirror 4a by which an image bearing light beam is split off toward a view finder system, and a third lens unit 5 which is stationary during zooming. The view finder system further includes total reflection mirrors 6 and 7, a pentagonal roof type prism 8 and an eyepiece 9. In this embodiment, the split-off part of the light beam is directed to the first mirror 6 by which it is reflected almost in parallel with an optical axis of the photographic system, forming a real finder image on a image plane 10. This image is observed through the second mirror 7, prism 8 and eyepiece 9. According to present invention, when zooming, the light beam splitter 4 and first reflection mirror 6 are made to axially move in unison not only with each other but with the second lens unit 2 in such a way as shown by the locus of movement indicated by arrow, while the first lens unit 1 is simultaneously axially moved in a differential relation thereto. Thereby, the first image plane 10 of the view finder is maintained in a constant position throughout the entire zooming range. Another feature of the invention is that the aperture stop 3 is positioned in the rearmost one of the zoom lens units enabling the axial separation between the aperture stop 3 and beam splitter 4 to be minimized. This feature, in combination with the first one, enables the axial thickness of the beam splitter 4 to be far shorter than was heretofore possible and therefore the diameter of the light beam to the view finder system to be reduced. In such a way, a minimization of the size of the view finder system is achieved.

In the case where the beam splitter 4 is positioned behind the zoom section as in the foregoing embodiment, it is preferable to construct the zoom section in the form of a converting system, because there is no need to introduce an image forming system into a space between the beam splitter 4 and the first image plane 10, for the structure of construction of the view finder system is simplified. It should also be noted that the arrangement of this embodiment is suited to the camera whose photographic lens system is not interchangeable, particularly because the shutter is not necessarily positioned just ahead the film plane, for it may be brought forward just behind the beam splitter with an advantage that the size of the aperture opening of the shutter can be made relatively small. As a result, determination of the lateral length of the camera can be made mainly by the diameter of the film cartridge plus the length of the lateral side of the picture frame. Thus, a further reduction of the size of the entire body of the camera can be achieved with ease.

Figure 3:
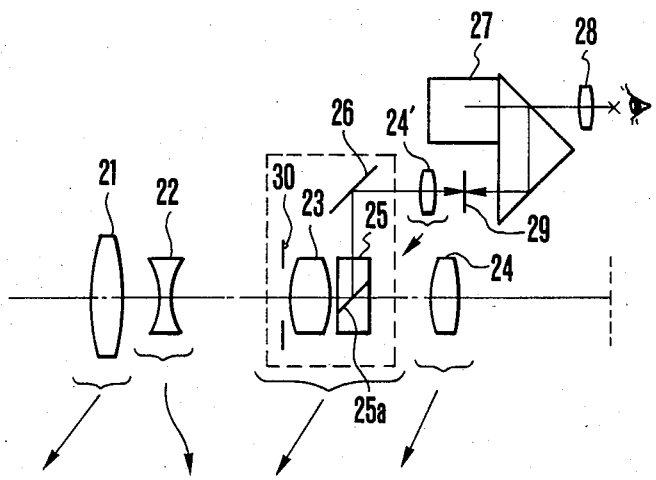

FIG. 3 illustrates another embodiment of the invention in which the beam splitter is positioned within the zoom section. The zoom lens comprises first to fourth lens units 21 to 24, respectively, all of which are axially movable for zooming. The view finder system of FIG. 3 comprises a beam splitter 25, a reflection mirror 26, and a Porro prism 27 which enables a finder image on a first image plane 29 to be observed as a correct image through an eyepiece 28. In this embodiment, an aperture stop 30, the third lens unit 23, the beam splitter 25 and the reflection mirror 26 are made to axially move in unison in a direction indicated by arrow when zooming from the wide angle to telephoto end. Also, because the beam splitter 27 is followed by the fourth lens unit 24 which is not stationary during zooming, it becomes automatically necessary to introduce a corresponding lens unit 24', movable with zooming, into the finder system so that the finder image plane 29 is maintained in a constant position throughout the zooming range.

The feature that the beam splitter 25 and the aperture stop 30 are put into one and the same lens unit of the zoom section enables the diameter of the lens unit that follows to be shortened, and further the effective diameter of the view finder system to be prevented from increasing. Thus, a minimization of the size of the zoom lens, as a whole, is achieved.

In this embodiment, since behind the beam splitter 25 there is provided a lens unit movable for zooming, a lens system that precedes the beam splitter 25 may be either a diverging or afocal system.

It is to be noted in connection with the first and second embodiments that when zooming, the aperture stop and the beam splitter may be moved at different speeds in the same direction, or may be put into respective adjacent zoom units which move in the same direction, when the objects of the invention are accomplished. Also, in the embodiments of the invention, the finder image to be observed may be either in the air or on a focusing screen. In the former case, it is preferred to use a collection lens near the first image plane 10, for the proportion of the image-contributing light to the split-off light is increased.

An example of a specific zoom lens based on the principle of the first embodiment of FIG. 2 is illustrated in block form in FIG. 4, and can be constructed in accordance with the numerical data given in the following table for the radii of curvature, R, the axial thicknesses or air separations, D, and the refractive indices, N, and Abbe number, v, of the glasses of the elements with subscripts numbered consecutively from front to rear.

To express the aspheric surface, an X-axis is taken as the optical axis, a Y-axis in a direction perpendicular to the optical axis, and the direction in which light advances as positive with an original point at the vertex of the surface. Then, an equation for the sag X of the asphere from a sphere that contributes to determination of the focal length, is obtained by the following power series of the height, H, from the optical axis:

$$X = \frac{\left(\frac{1}{R}\right) H^2}{1 + \sqrt{1 - \left(\frac{H}{R}\right)^2}} + AH^2 + BH^4 + CH^6 + DH^8 + EH^{10}$$

where R is the radius of vertex curvature, and A to E are the aspheric coefficients.

Numerical Example:
F = 36-68  FNO = 1:3.5-4.5  2ω = 62°-35.3°

| | | |
|---|---|---|
| R1 = −180.93 | D1 = 1.37 | N1 = 1.77250  ν1 = 49.6 |
| R2 = 20.08 | D2 = 3.11 | |
| R3 = 24.24 | D3 = 3.50 | N2 = 1.80518  ν2 = 25.4 |
| R4 = 44.20 | D4 = Variable | |
| R5 = 26.95 | D5 = 5.00 | N3 = 1.69680  ν3 = 55.5 |
| R6 = −114.77 | D6 = 0.20 | |
| R7 = 15.24 | D7 = 5.27 | N4 = 1.65160  ν4 = 58.6 |
| R8 = 37.13 | D8 = 1.12 | |
| R9 = −630.57 | D9 = 2.30 | N5 = 1.84666  ν5 = 23.9 |
| R10 = 12.71 | D10 = 1.02 | |
| R11 = 26.49 | D11 = 4.00 | N6 = 1.67270  ν6 = 32.1 |
| R12 = −45.53 | D12 = 0.50 | |
| R13 = Aperture Stop | D13 = 1.00 | |
| R14 = Half Prism | D14 = 7.00 | N7 = 1.51633  ν7 = 64.1 |
| R15 = Half Prism | D15 = 1.00 | |
| R16 = Shutter | D16 = Variable | |
| R17 = −19.50 | D17 = 1.20 | N8 = 1.7725  ν8 = 49.6 |
| R18 = 54.26 | D18 = 6.00 | N9 = 1.59551  ν9 = 39.2 |
| R19 = −19.93 | | |

Separations during Zooming

| | f | | |
|---|---|---|---|
| D | 36 | 50 | 68 |
| D4 | 17.019 | 7.198 | 0.514 |
| D16 | 4 | 10.603 | 19.092 |

| Aspheric Surface | Coefficients | | | |
|---|---|---|---|---|
| | A | B | C | D |
| R1 | 0 | −1.5354 × 10⁻⁶ | 3.2245 × 10⁻⁹ | 4.4173 × 10⁻¹² |
| R2 | 0 | −2.3212 × 10⁻⁶ | −1.9659 × 10⁻⁹ | 8.2312 × 10⁻¹² |

Figure 4:
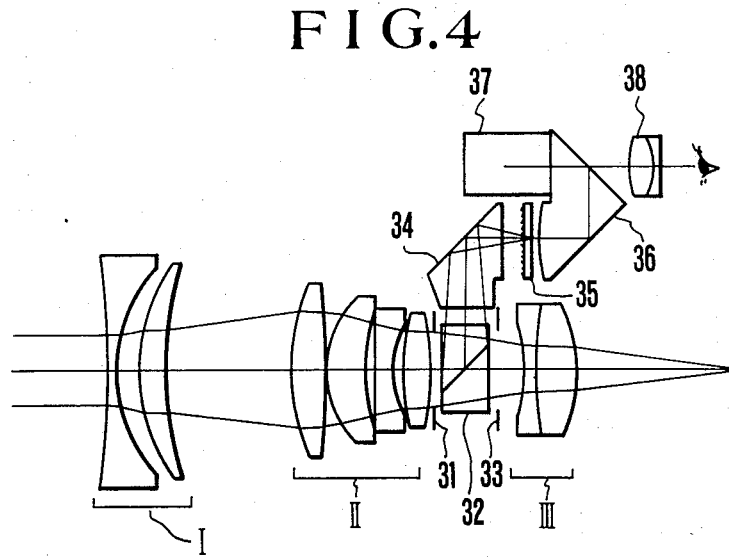
FIG. 4 is a lens block diagram of an example of a specific zoom lens of the type shown in FIG. 2.
Figure 5:
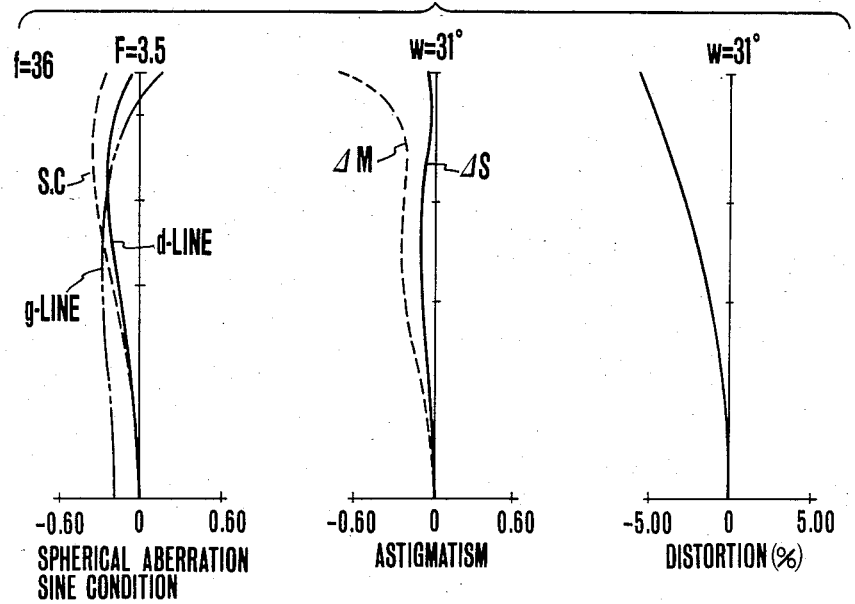
FIGS. 5, 6 and 7 are graphic representations of the various aberrations of the lens of FIG. 4 in the wide angle, intermediate and telephoto position, respectively.
Figure 6:
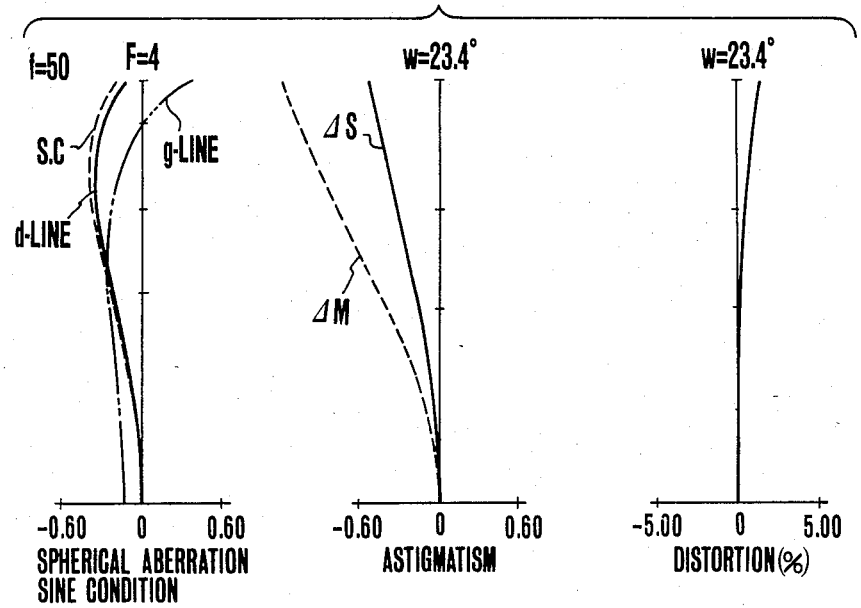
Figure 7:
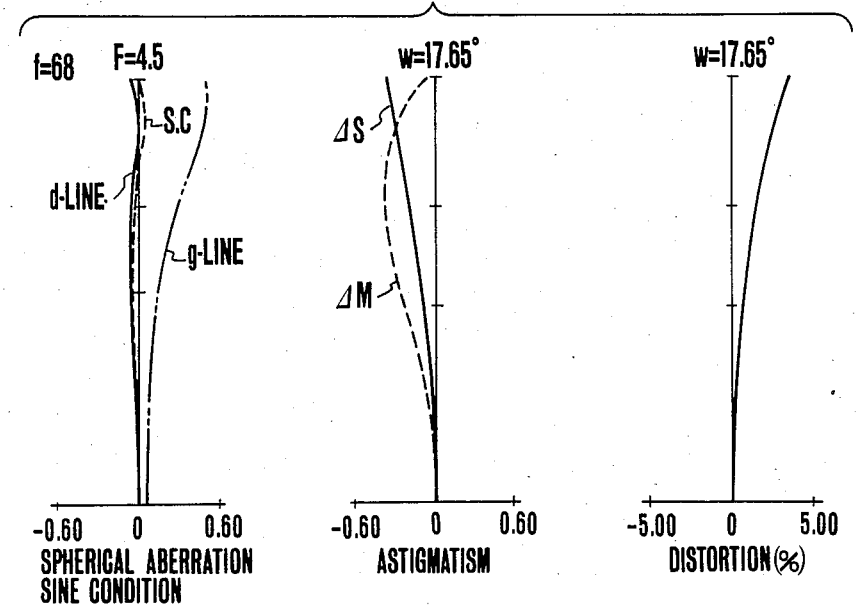

In FIG. 4, the zoom lens comprises, from front to rear, a first lens unit I (R1-R4) of negative power, a second lens unit II (R5-R12) of positive power, and a third lens unit III (R17-R19) of negative power. Positioned in the space between the second and third lens units II and III are an aperture stop 31 (R13), a beam splitter 32 (R14-R15) and a shutter 33 (R16), in this order from the front. The view finder system comprises a prism 34 having a total reflection surface, a focusing screen 35 having a transparent Fresnel lens, a first triangular prism 36, whose entrance face is convex toward the front and constituting a Porro prism together with a second triangular prism 37, and an eyepiece 38. Zooming is performed by moving the first and second lens units I and II axially in differential relation. Since the third lens unit III takes its place very near the film gate, its cross-section to the optical axis can be made to conform to the rectangular shape of the film gate with an advantage of assisting in minimizing the size of the lens system, as a whole.

The view finder system of FIG. 4 is able to vary its image magnification at the same time when the focal length of the zoom lens varies, while still maintaining constant the position of the finder image plane at or near the focusing screen 35. Hence, it becomes possible to prevent the diopter of the finder image from shifting for comfortable observation throughout the entire zooming range.

This embodiment may be modified in many ways, in particular, such that the focusing screen 35 is omitted so that the image to be observed is in the air. In this case, to increase the efficiency of the finder image bearing beam, it is preferable to use a collection lens as arranged near the first image plane.

It should be recognized that in this embodiment, a feature of the invention is that the aperture stop 31 and the beam splitter 32 are juxtaposed to each other, and are arranged to move in unison when zooming. This provides a possibility of maintaining the diameter of the light beam entering the view finder system stable at a minimum throughout the zooming range, thereby giving an advantage of achieving a great reduction of the size of the view finder system. Another feature is that the aperture stop 31 assumes a position at which the paraxial and oblique beams intersect, and, therefore, that almost the same diametrical area of the beam splitter can admit of both beams. This provides another possibility of largely reducing the acceptable minimum axial thickness of the beam splitter 32.

Another example of modification of the optical system of FIG. 4, is that the shutter 33 is made movable with zooming so that the size of the aperture opening is limited to a minimum. If there is room to increase that size, the shutter 33 may be left fixed. It is also possible to position the shutter 33 behind the third lens unit III.

It should be pointed out that this embodiment provides an arrangement of the view finder system in the photographic optical system, which arrangement enables also automatic focus detection to be made with high accuracy when a light source and a light receptor are positioned adjacent a member of the view finder system, for example, the focusing screen 35. Also, instead of the view finder system, use may be made of a range finder optical system for automatic focusing adjustment. Further, the view finder system may be associated with a light sensor for measuring the object brightness level as arranged either adjacent the focusing screen 35 or in axial alignment to the view finder system with the help of a half-mirror. Hence, good evaluation of the brightness level becomes possible.

Figure 8:
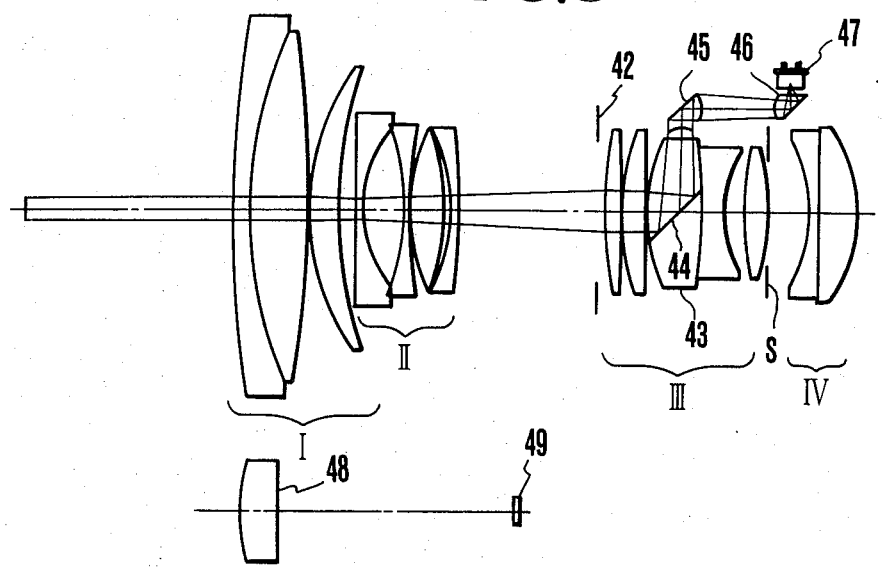
FIGS. 8 and 9 are longitudinal section views of another embodiment of an optical system according to the present invention.
Figure 9:
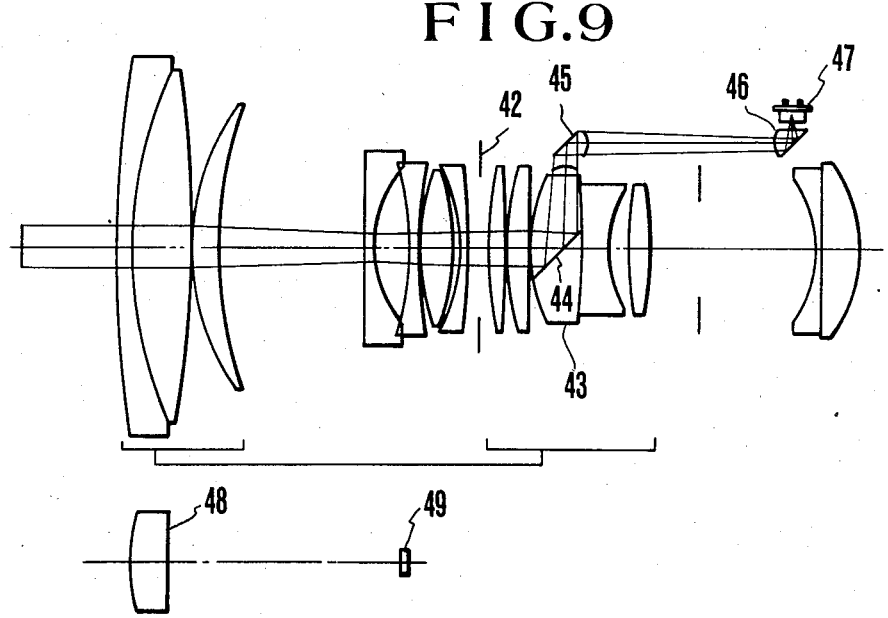

FIGS. 8 and 9 illustated yet another embodiment of the invention. The photographic objective system comprises, from front to rear, a first lens unit unit I of positive power, a second lens unit II of negative power, a third lens unit III of positive power, and a fourth lens unit IV of negative power. When zooming, the first and third lens units I and III are axially and linearly moved in unison, while the second lens unit II is simultaneously axially and non-linearly moved. As the necessity arises, use may be made of a stop S of fixed aperture opening for shuttering off part of the off-axis light pencil to improved the imaging performance as arranged behind the third lens unit III to move linearly with zooming in the same direction with the first and third lens units I and III. The movable aperture stop 42 is positioned in front of the third lens units unit III.

Also, in FIG. 8, 42 is an aperture stop; 43 is a beam splitter which also serves a lens function; 44 is a reflection surface arranged in the beam splitter 43 and consisting of a dichroic surface having a high transmittance for the visible region of wavelengths and a high reflectance for the infrared region. 45 is lens system having a prism in a portion thereof for conducting a split-reflected beam from the beam splitter 43 to light receiving means having a collection lens 48 and a light receptor 49 arranged in a portion of the interior of a camera body's lens barrel, or for conducting a light beam from light projecting means arranged in a portion of the lens barrel into the beam splitter 43.

In this embodiment, the aperture stop 42, beam splitter 43 and lens system 45 are made to move in unison with the third lens unit III.

46 is a lens system having a prism in a portion thereof either for conducting the light beam from the lens system 45 to the light receptor 47, or, in the case of 47 being a light source, for conducting a light beam from the light source 47 to the lens system 45.

It should be noted that the lens system 46 and the light source or light receptor 47 are held stationary during zooming. In this embodiment, the lens systems 45 and 46 and the light source (or receptor) 47 constitute part of focus detecting means together with light receiving means to be described later.

In this embodiment, the third lens unit III as an optical system and another optical system into which the split-reflected rays of light by the beam splitter 43 enter are made almost equal to each other in focal length and the position of the front principal point, so that when zooming, the light source or light receptor 47 does not change its position.

In the optical system of such construction, a pencil of the infrared region emitted from the light source 47 is collected by the lens system 46 with high efficiency, then pass through the lens system 45, then reflected from the reflection surface 44 of the beam splitter 43, and then projected through a portion of the optical system onto an object to be photographed. And, the reflected light from the object is received by the light receiving means arranged in the camera body or at a portion on the lens barrel. Focus detection is then performed by an active type of focus detector proposed in, for example, Japanese Laid-Open Patent Application No. SHO 57-154206.

When zooming from the wide angle end of FIG. 8 to the telephoto end of FIG. 9, not only the aperture stop 42 but also the beam splitter 43 is moved so that the eclipsing of the off-axis pencil passing through the aperture stop 42 by the reflection surface 44 is minimized to prevent color unevenness from occurring in the marginal zone of the picture frame, and to prevent the axial thickness of the beam splitter from increasing. Thus, a shortening of the entire length of the lens system is achieved.

It should be noted that in this embodiment, the beam splitter 43 may be constructed in the form of a parallel plate having a reflection layer of dichroic material in the interior thereof. Also, the lens systems 45 and 46 each may be constructed in a separate form between the prism and the lens.

Also, a light receptor is arranged in place of the light source 47, while the light source 47 is put to a portion on the lens barrel or in the camera body. Further, when zooming, the aperture stop and the beam splitter may be moved at different speeds from each other.

Next shown is a numerical example of the invention. In the numerical example, Ri is the radius of curvature of the i-th lens surface counting from the front, Di is the i-th lens thickness or air separation counting from the front, and Ni and vi are the refractive index and Abbe number of the glass of the i-th lens element counting from the front, respectively.

Photographic System:
$F = 36-106 \quad FNO = 1:3.5-4.5 \quad 2\omega = 62°-23°$

| | | |
|---|---|---|
| R1 = 170.85 | D1 = 2.25 | N1 = 1.80518 $\nu1 = 25.4$ |
| R2 = 59.96 | D2 = 7.86 | N2 = 1.60311 $\nu2 = 60.7$ |
| R3 = −131.94 | D3 = 0.12 | |
| R4 = 34.11 | D4 = 3.27 | N3 = 1.60311 $\nu3 = 60.7$ |
| R5 = 67.42 | D5 = Variable | |
| R6 = 532.89 | D6 = 1.20 | N4 = 1.80400 $\nu4 = 46.6$ |
| R7 = 17.03 | D7 = 4.66 | |
| R8 = −45.57 | D8 = 1.15 | N5 = 1.83481 $\nu5 = 42.7$ |
| R9 = 58.12 | D9 = 0.11 | |
| R10 = 30.72 | D10 = 4.50 | N6 = 1.80518 $\nu6 = 25.4$ |
| R11 = −36.10 | D11 = 0.77 | |
| R12 = −23.41 | D12 = 1.15 | N7 = 1.80400 $\nu7 = 46.6$ |
| R13 = −73.83 | D13 = Variable | |
| R14 = Aperture Stop | D14 = 1.00 | |
| R15 = 87.56 | D15 = 2.42 | N8 = 1.65160 $\nu8 = 58.6$ |
| R16 = −107.33 | D16 = 0.10 | |
| R17 = 35.62 | D17 = 2.98 | N9 = 1.72000 $\nu9 = 50.2$ |
| R18 = 195.79 | D18 = 0.10 | |
| R19 = 17.80 | D19 = 7.67 | N10 = 1.54072 $\nu10 = 47.2$ |
| R20 = −162.13 | D20 = 2.16 | N11 = 1.84666 $\nu11 = 23.9$ |
| R21 = 14.81 | D21 = 2.86 | |
| R22 = 52.19 | D22 = 2.90 | N12 = 1.59551 $\nu12 = 39.2$ |
| R23 = −39.09 | D23 = Variable | |
| R24 = Movable Stop | D24 = Variable | |
| R25 = −20.89 | D25 = 2.84 | N13 = 1.81600 $\nu13 = 46.6$ |
| R26 = 184.78 | D26 = 6.00 | N14 = 1.63930 $\nu14 = 44.9$ |
| R27 = −19.9 | | |

| | f | | |
|---|---|---|---|
| D | 36 | 70 | 106 |
| D5 | 2.038 | 13.477 | 19.424 |
| D13 | 19.465 | 8.026 | 2.078 |
| D23 | 0.832 | 4.944 | 7.282 |
| D24 | 1.2 | 7.2 | 10.7 |

Aspheric Surface: R23 The definition of the aspheric coefficients follows the above-described expanded equation.

$A = 0$
$B = 5.4772 \times 10^{-6}$
$C = -4.3046 \times 10^{-8}$
$D = 3.4 \times 10^{-10}$ Next shown is a numerical example of the focus detecting system comprising the lens systems 45 and 46.

Focus Detecting System:
$F = 7-20$

| | | |
|---|---|---|
| R1 = −4.60 | D1 = 5.05 | N1 = 1.49171 $\nu1 = 57.4$ |
| R2 = −8.15 | D2 = Variable | |
| R4 = 3.5 | D3 = 5.0 | N2 = 1.49171 $\nu2 = 57.4$ |
| R4 = ∞ | | |

| | f | | |
|---|---|---|---|
| D | 7 | 14 | 20 |
| D2 | 10 | 20.182 | 26.06 |

The values of the focal length, "7", "14" and "20" corresponds to the values "36", "70" and "105" of the focal length of the photographic system, respectively.

The distance from the entrance face (R19) of the beam splitter 43 to the exit face is 19.42, and the air separation between the exit face and the lens surface R1 of the lens system 45 is 0.96.

R1 and R2 correspond to the lens system 45, and R3 and R4 to the lens system 46.

What is claimed is:

1. An optical system comprising:
   an image forming zoom optical system having first optical means axially movable when zooming; and
   light beam splitting means for splitting an optical path of said image forming optical system, said light beam splitting means moving in response to a movement of said first optical means.

2. An optical system according to claim 1, wherein said image forming zoom optical system has second optical means movable at the same time with, and independently of, said first optical means.

3. An optical system according to claim 2, wherein said second optical means moves in unison with said beam splitting means.

4. An optical system according to claim 1, wherein said image forming zoom optical system has third optical means on the image side of said beam splitting means.

5. An optical system according to claim 4, wherein said third optical means remains stationary when said first optical means moves.

6. An optical system according to claim 4, wherein said third optical means moves at the same time with and independently of said first optical means.

7. An optical system according to claim 1, wherein said image forming zoom optical system has a stop movable at the same time with said beam splitting means on the object side of said beam splitting means.

8. An optical system according to claim 7, wherein said stop moves in unison with said beam splitting means.

9. An optical system according to claim 1, wherein a view finder is arranged on the path of a split-off beam of said splitting means.

10. An optical system according to claim 1, wherein means for focus detection is arranged on the path of a split-off beam of said slitting means.

11. An optical system according to claim 10, wherein said means for focus detection has a light emitting element and a projection lens.

12. An apparatus comprising:
   (a) an imaging optical system having optical means axially movable for varying a magnification of said imaging optical system;
   (b) splitting means for splitting at least a portion of a photo-taking light flux of said imaging optical system, said splitting means moving on the optical axis in response to a movement of said optical means; and
   (c) observation means for observing one of the light fluxes which has been split by said splitting means, wherein another one of the split light fluxes is imaged by said imaging optical system.

13. An apparatus according to claim 12, wherein said observation means images said light flux.

14. An apparatus according to claim 12, wherein said splitting means is moved in a manner that an imaging position of said observation means is in a predetermined position.

15. An apparatus according to claim 12, wherein said imaging optical system has an aperture diaphragm which independently moves in a same direction as that of said splitting means in an integral manner.

16. An apparatus according to claim 12, wherein said observation means has a reflectance member for reflecting a portion of the photo-taking light flux which has been split by said splitting means in a direction almost parallel to the optical axis of said imaging optical system, said reflectance member being integrally moved with said splitting means in varying the magnification and at the same time an imaging position of said observation image is positioned at an observation side of said reflectance member.

17. An apparatus acoording to claim 16, wherein said splitting means is positioned within said optical means.

18. An apparatus according to claim 17, wherein said optical means comprises lens groups and said splitting means is positioned at a part of the lens groups at an image plane side of the optical means, and is moved together with said lens groups.

19. An apparatus according to claim 12, further comprising a condenser lens positioned in the vicinity of an imaging position of said observation means so that an observation image is observed through said condenser lens.

20. An apparatus comprising:
   (a) an imaging optical system having optical means axially movable for varying a magnification of said imaging optical system;
   (b) splitting means for splitting at least a portion of light flux of said imaging optical system, said splitting means moving in response to a movement of said optical means; and
   (c) detection means for detecting the light flux split by said splitting means thus producing information relating to a state of a focus adjustment of said imaging optical system.

21. An apparatus according to claim 20, wherein said splitting means constitutes a portion of said optical means.

22. An apparatus according to claim 20, wherein said splitting means has a dichroic plane which possesses a high transmittance in the visible beam region and a high reflectance in the infrared region.

23. An apparatus according to claim 20, further comprising an aperture diaphragm positioned at an object side of side splitting means, said aperture diaphragm moving in response to movement of said optical means.

* * * * *